United States Patent [19]

Ushida et al.

[11] Patent Number: 4,935,275

[45] Date of Patent: Jun. 19, 1990

[54] POLYURETHANE MATERIAL FOR DECORATIVE PARTS

[75] Inventors: Yoshio Ushida, Inazawa; Shinji Jinushi, Gifu; Yoshio Yamazaki, Aichi, all of Japan

[73] Assignee: Toyoda Gosei Co., Ltd., Nishikasugai, Japan

[21] Appl. No.: 178,375

[22] Filed: Apr. 6, 1988

[30] Foreign Application Priority Data

Apr. 27, 1987 [JP] Japan ............................... 62-103797
Jun. 26, 1987 [JP] Japan ............................... 62-160501

[51] Int. Cl.$^5$ .............................................. C08K 5/34
[52] U.S. Cl. .................... 428/31; 252/182.21; 428/424.6; 524/91; 524/102; 524/108; 524/291
[58] Field of Search .................... 428/31, 424.6; 252/182.21; 524/91, 208, 291, 102

[56] References Cited

U.S. PATENT DOCUMENTS

| | | | |
|---|---|---|---|
| 3,215,724 | 11/1965 | Strobel et al. | 524/208 |
| 3,944,594 | 3/1976 | Kleiner et al. | 560/75 |
| 4,566,929 | 1/1986 | Waugh | 156/242 |
| 4,708,894 | 11/1987 | Mabuchi et al. | 428/31 |
| 4,721,744 | 1/1988 | Ishii et al. | 524/91 |

FOREIGN PATENT DOCUMENTS 56-136843 10/1981 Japan .
61-207249 9/1986 Japan .

*Primary Examiner*—Veronica P. Hoke
*Attorney, Agent, or Firm*—Cushman, Darby & Cushman

[57] ABSTRACT

A polyurethane material for decorative parts is disclosed which is a tow-liquid type material comprising a polyol component and an isocyanate component and having a stabilizer incorporated in the polyol component. The stabilizer is a ternary system of a specific hindered amine type ultraviolet stabilizer, a specific hindered phenol type antioxidant, and a specific benzotriazole type ultraviolet absorbent or acrylontrile type ultraviolet absorbent. A transparent synthetic resin part formed by potting this polyurethane material on the upper surface of a base excels in weatherability and lightfastness. Thus, the present invention provides decorative parts which retain good appearance for a long time.

5 Claims, 1 Drawing Sheet

POLYURETHANE MATERIAL FOR DECORATIVE PARTS

BACKGROUND OF THE INVENTION

This invention relates to a polyurethane material for decorative parts. More particularly, this invention relates to a material suitable for the formation of a transparent synthetic resin part possessing a positive meniscus on a base of synthetic resin in interior and exterior decorative parts of automobiles requiring exacting lightfastness such as, for example, steering wheels, ornaments and marks for incorporation in interior wall materials, and various moldings including side moldings, bumper moldings locker moldings, and interior ornamental strips.

As a typical representative of the decorative marks enumerated above, a mark 1 illustrated in FIG. 1 which is intended for incorporation in a steering wheel will be described below. It should be noted that the mark is selected purely for illustration and is never meant as a limitation on the invention.

This mark 1 is produced by a method which comprises casting a liquid transparent synthetic resin material of suitable viscosity on an upper surface 3a of a disc-shaped base 3 made of synthetic resin or metal and provided with an edged periphery and then allowing the cast resin to set thereby giving rise to a transparent synthetic resin part 5 possessing a positive meniscus (so-called potting method) (Japanese Patent Application Disclosures SHO No. 58(1983)-221,741 and SHO No. 61(1986)-207,249). As the material for the transparent synthetic resin part 5 mentioned above, it has been customary to employ a two-liquid type polyurethane material using a polyol component and an isocyanate component with a view to ensuring resistance to abrasion and resistance to shock, for example. The aforementioned polyol component generally incorporates a combination of various stabilizers therein for the main purpose of preventing the produced mark from yielding to discoloration or development of cracks under the influence of solar rays and ozone in the air.

As stabilizers mentioned above, hindered amine type ultraviolet light stabilizers represented by bis(2,2,6,6-tetramethyl-4-piperidyl)sebacate and hindered phenol type antioxidants represented by pentaerythrityl-tetrakis-[3-(3,5-di-t-butyl-4-hydroxyphenyl)propionate] have been generally used in combination.

The inventors' test performed on the aforementioned combination of stabilizers, however, has revealed that long retention of good appearance with this combination of stabilizers is difficult to achieve (Comparative Experiment, Table 2). To be specific, products using such stabilizers show signs of discoloration and surface fusion (ready impartation of finger prints on the surface of a test piece) after the test of exposure to weather conditions or the test of exposure to light.

SUMMARY OF THE INVENTION

The polyurethane material for decorative parts contemplated by this invention is a two-liquid type material using a polyol component and an isocyanate component separately and having stabilizers incorporated in the polyol component, which decorative material is characterized by using as stabilizers a ternary system composed of a specific hindered amine type ultraviolet stabilizer and a specific hindered phenol type antioxidant in combination with a specific benzotriazole type ultraviolet absorbent or an acrylonitrile type ultraviolet absorbent. Owing to the construction described above, the polyurethane material of the present invention produces on the upper surface of a base made of a specific material a transparent material which shows no sign of discoloration or surface fusion after the test for weatherability or the test for lightfastness as demonstrated in the working examples cited later. This invention, therefore, permits production of decorative parts enjoying retention of good appearance for a long time.

DETAILED DESCRIPTION OF THE INVENTION

Figure 1:
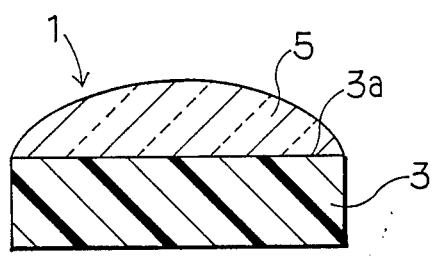
FIG. 1 is a cross section illustrating a typical decorative part for which the polyurethane material of the present invention can be used.

I. The polyurethane material of this invention for decorative parts comprises a polyol component and an isocyanate component and has a specific ternary stabilizer incorporated in the polyol component.

A. As examples of the aforementioned polyol component, there can be cited those of (1) the polyether type, (2) the polyester type, (3) the polycarbonate type, and (4) the polymer polyol type to be enumerated below. From the standpoint of resistance to hydrolysis, the polyether type proves to be particularly desirable among other types mentioned above.

(1) Polyether polyol

There are bifunctional, trifunctional, and tetrafunctional polyether polyols which are obtained by the reaction of such cyclic ethers as ethylene oxide, propylene oxide, butylene oxide, and styrene oxide with such low molecular polyols as ethylene glycol, diethylene glycol, glycerin, trimethylol propane, and bis-phenol A. Generally, polyether polyols having molecular weights in the range of 2,000 to 7,000 are used in this invention.

(2) Polyester polyol

There are polyester polyols which are obtained by causing such diols as ethylene glycol, polyoxyethylene glycol, dipropylene glycol, and polyoxypropylene glycol to react in an excess amount upon such dicarboxylic acids as succinic acid, glutaric acid, adipic acid, and piperic acid. Generally, polyester glycols having molecular weights in the range of 3,000 to 8,000 are used in this invention.

(3) Polycarbonate polyol

There are polycarbonate polyols which are obtained by the reaction of the reaction of 1,6-hexanediol with such compounds as ethylene carbonate and caprolactan. Generally, polycarbonate polyols having molecular weights in the range of 1,000 to 2,000 are used in this invention.

(4) Polymer polyol

There are polymer polyols which are obtained by the graft polymerization of acrylonitrile and/or such a vinyl monomer as styrene to polyether polyols. Generally, polymer polyols having molecular weights in the range of 4,000 to 7,000 are used in the present invention.

B. As examples of the aforementioned isocyanate component, there can be cited those of (1) the aliphatic type and (2) the aromatic type to be enumerated below. From the standpoint of resistance to yellowing, the aliphatic type is more desirable than the aromatic type.

(1) Aliphatic type isocyanate

There are alicyclic isocyanates as well as aliphatic isocyanates. Examples of these types of isocyanates include hexamethylene diisocyanate (HMDI), xylene diisocyanate (XDI), hydrated xylene diisocyanate (hydrated XDI), 4,4'-methylenebisdicyclohexyl diisocyanate (H12MDI), methylcyclohexyl diisocyanate (hydrated TDI), and ispholone diisocyanate (IPDI). Further, as examples of aliphatic type isocyanate which prove to be particularly desirable from the standpoint of convenience of handling, there can be cited dimers, trimers, trimethylol propane adducts, and prepolymers of aliphatic type isocyanates which have increased molecular weights.

(2) Aromatic type isocyanate

Examples of the aromatic type isocyanate, there can be cited 4,4'-diphenyl methane diisocyanate (hereinafter referred to as "MDI" for short), crude MDI, liquid MDI, trilene diisocyanate, and phenylene diisocyanate. As examples of the aromatic type isocyanate which prove to be particularly desirable from the standpoint of convenience of handling, there can be cited dimers, trimers, trimethylol propane adducts, and prepolymers of aromatic type isocyanates which have increased molecular weights.

C. The combinations of three members for the ternary stabilizer to be added to the aforementioned polyurethane material (generally to the polyol component thereof) fall under the first combination and the second combination as follows.

The amount of each of the components thus added is generally in the range of 0.1 to 2.0 parts by weight, based on 100 parts by weight of the amount of the urethane polymer.

First Combination of Stabilizers (a) A hindered amine type ultraviolet stabilizer represented by the following chemical formula.

As a concrete example of this stabilizer, there can be cited 2-(3,5-di-t-butyl-4-hydroxybenzyl)-2-n-butylmalonic acid bis(1,2,2,6,6-pentamethyl-4-piperidyl).

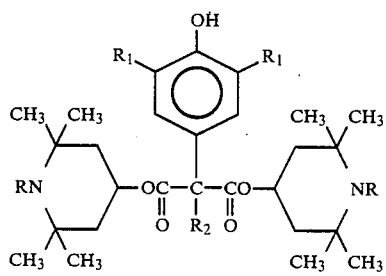

(wherein $R_1$ stands for a t-butyl group, $R_2$ for a n-alkyl group of 3 to 5 carbon atoms, and $R_3$ for a hydrogen atom or a methyl group).

(b) A benzotriazole type untraviolet absorbent represented by the following chemical formula.

As concrete examples of this absorbent, there can be cited 2-(3,5-di-t-amyl-2-hydroxyphenyl)benzotriazole and 2-[2-hydroxy-3,5-bis(α,α-dimethylbenzyl)phenyl]-2H-benzotriazole.

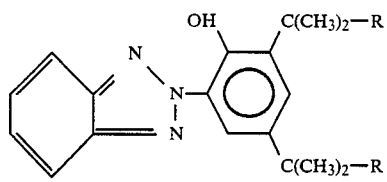

(wherein R stands for an ethyl group or a phenyl group).

(c) A hindered phenol type antioxidant represented by the following chemical formula.

As concrete examples of this antioxidant, there can be cited triethylene glycol-bis[(3-(3-t-butyl-5-methyl-4-hydroxyphenyl) propionate] and 1,6-hexanediol-bis[3-(3,5-di-t-butyl-4-hydroxyphenyl)propionate).

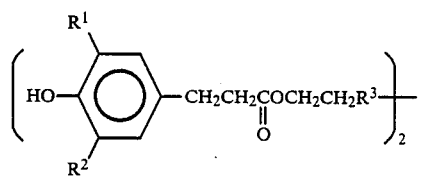

(wherein $R^1$ stands for a branched alkyl group of 3 to 6 carbon atoms, $R^2$ for $R^1$, $CH_3$ or $C_2H_5$, and $R^3$ for $CH_2$ or $OCH_2$).

Second combination of Stabilizers (a) A hindered amine type ultraviolet stabilizer represented by the following chemical formula.

As concrete examples of this type of ultraviolet stabilizer, there can be cited bis(2,2,6,6-tetramethyl-4-piperidyl) sebacate and bis(1,2,2,6,6,-pentamethyl-4-piperidyl) sebacate.

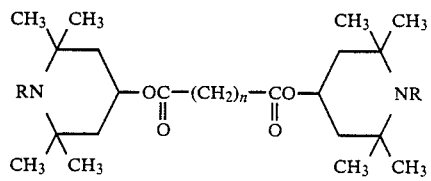

(wherein n stands for an integer in the range of 6 to 10 and R for a hydrogen atom or a methyl group).

(b) An acrylonitrile type ultraviolet absorbent represented by the following chemical formula.

As concrete examples of this type of ultraviolet absorbent, there can be cited α-cyano-β-phenyl-(2-ethylhexyl) cinnamate and α-cyano-β-phenylethyl cinnamate.

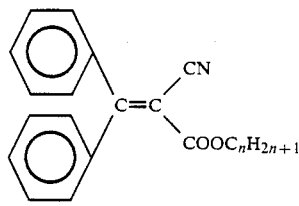

(wherein n stands for an integer in the range of 2 to 8).

(c) The same hindered phenol type antioxidant as (c) used in the first combination described above.

D. The aforementioned polyurethane material generally incorporates therein (a) a heavy metal type catalyst or (b) an amine type catalyst indicated below and other additives such as, for example, surfactant (for improvement of leveling property), pigment, and dye.

(a) Heavy metal type catalyst: Examples of this type include dibutyl tin dilaurate, dibutyl tin fumarate, dibutyl tin acetate, stannous octylate, cobalt naphthenate, zinc naphthenate, and cobalt octylate.

(b) Amine type catalyst: Examples of this type of catalyst include triethyl amine, N-methyl morpholine, N,N-dimethylcyclohexyl amine, N,N-dimethylethanol amine, N,N'-diethylethanol amine, pentamethyl diethylene triamine, and triethylene diamine. II. Now, the method by which a mark (decorative part) illustrated in FIG. 1 is produced by the use of the polyurethane material described above will be explained.

A polyol component and an isocyanate component, each of the foregoing description, are mixed in a substantially stoichiometric ratio. The resultant mixture is deaerated under a vacuum to obtain a polyurethane material. By potting this polyurethane material on the upper surface of a base 3, there is formed a transparent synthetic resin part 5.

The base 3 is formed by extrusion or injection molding such a synthetic resin material as acrylonitrile-butadiene-styrene terpolymr (ABS), polyvinyl chloride (PVC), nylon (polyamide), polycarbonate, acrylonitrile-styrene copolymer (AS), or ionomer which excels in resistance to heat and resistance to shock. Otherwise, the base 3 may be formed with a metallic material such as aluminum.

EXAMPLES

Now, the present invention will be described more specifically below with reference to working examples.

Examples I:

A polyol component mixed with a catalyst and a stabilizer and an isocyanate component selected by the formula of Table 1 were separately deaerated under a vacuum (under the conditions of 60° C. × 5 mmHg × 1 h) and mixed. The mixture was gain deaerated under a vacuum (under the conditions of 60° C. × 5 mmHg × 5 min.) to obtain a potting material. This potting material was deposited in the form of a bulb on a base of PVC preheated to 70° C. and then caused to set under the conditions of 80° C. × 30 min. to form a mark possessing a transparent synthetic part. As the stabilizer in the aforementioned formula, a varying combination of stabilizers shown in Table 2 was used.

(a) Hindered amine type ultraviolet stabilizer:
(1) Bis(2,2,6,6-tetramethyl-4-piperidyl) sebacate
(2) Poly[6-[(1,1,3,3-tetramethylbutyl)imino-1,3,5-triazine-2,4-diyl][(2,2,6,6-tetramethyl-4-piperidyl)imino hexamethylene][(2,2,6,6-tetramethyl-4-piperidyl)imino,]]
(3) 2-(3,5-Di-t-butyl-4-hydroxybenzyl)-2-n-butylmalonic acid bis(1,2,2,6,6-pentamethyl-4-piperidyl)
(b) Benzotriazole type ultraviolet absorbent:
(4) 2-[2-Hydroxy-3,5-bis(α,α-dimethylbenzyl)-phenyl]-2H-benzotriazole
(5) 2-(3,5-Di-t-butyl-2-hydroxyphenyl)benzotriazole
(6) 2-(3,5-Di-t-amyl-2-hydroxyphenyl)benzotriazole
(c) Hindered phenol type antioxidant
(7) Triethylene glycol-bis[3-(3-t-butyl-5-methyl-4-hydroxyphenyl)propionate]
(8) 2,4-Bis-(n-octylthio)-6-(4-hydroxy-3,5-di-t-butylanilino)-1,3,5-triazine
(9) Pentaerythrityl-tetrakis[3-(3,5-di-6-butyl-4-hydroxyphenyl)propionate]

(Test for evaluation)

The test pieces (marks) obtained in working examples I and comparative experiments as described above were subjected to 1,000 hours' test for lightfastness with a hot Fade-O-Meter, using a blackpanel at 83°±3° C. After the test, they were visually examined to determine whether or not they sustained discoloration or surface fusion. The results were rated on the three-point scales, wherein ○ stands for absence of change, Δ for a slight sign of change, and x for a conspicuous sign of change.

From the results of the evaluation shown in Table 2, it is noted that the test pieces using combinations of stabilizers not falling within the ranges contemplated by the present invention were incapable of retaining good appearance of the decorative parts for a long time.

Examples II:

Molds were produced by faithfully following the procedure of Examples II. In this case, a varying combination of stabilizers shown in Table 3 was used.

Hindered amine type ultraviolet stabilizer:
(1) Bis(2,2,6,6-tetramethyl-4-piperidyl) sebacate
(2) Polycondensate of succinic acid and dimethyl-1-(2-hydroxyethyl)-4-hydroxyl-2,2,6,6-tetramethyl piperidine
(b) Benzotriazole type ultraviolet absorbent
(3) 2-(5-Methyl-2-hydroxyphenyl) benzotriazole
(4) 2-[2-Hydroxy-3,5-bis(α,α-dimethylbenzyl)-phenyl]-2H-benzotriazole
(5) 2-(3,5-di-t-amyl-2-hydroxyphenyl)benzotriazole
(c) Acrylonitrile type ultraviolet absorbent:
(6) α-Cyano-β-phenyl-(2-ethylhexyl) cinnamate
(d) Hindered phenol type antioxidant
(7) Triethylene glycol-bis[3-(3-t-butyl-5-methyl-4-hydroxyphenyl)propionate]
(8) Pentaerythrityl-tetrakis[3-(3,5-di-t-butyl-4-hydroxyphenyl]propionate
(e) Organic sulfur type antioxidant
(9) Ditridecyl-3,3'-thiodipropionate (Test for evaluation)

The test pieces (molds) obtained in working examples II and comparative experiments as described above were subjected to 1,000 hours' test for weatherability with a sunshine Weather-O-Meter, using a black panel at 63° C. After the test, they were visually examined to determine whether or not they sustained discoloration, surface crack, or surface fusion (stickiness). The results were rated on the three-point scales, wherein O stands for absence of change, Δ for a slight sign of change, and x for a conspicuous sign of change.

It is noted from the results of the test given in Table 3 that the test pieces using combinations of stabilizers not falling within the ranges contemplated by this invention were incapable of retaining good appearance of moldings for a long time.

TABLE 1

| | (Units: parts by weight) | |
| --- | --- | --- |
| Combination | Description | Proportion for combination |
| Polyol | Propylene oxide adduct of | 10 |

TABLE 1-continued
(Units: parts by weight)

| Combination | Description | Proportion for combination |
|---|---|---|
| component | bis-phenol A | |
| | Ethylene oxide-propylene oxide adduct of bis-phenol A | 10 |
| Isocyanate component | Prepolymer of hexamethylene diisocyanate | 17 |
| Catalyst | Dibutyl-tin-dilaurate | 0.01 |
| Stabilizer | See Table 2 and Table 3. | |

TABLE 2

| Stabilizer | Examples I 1 | 2 | 3 | 4 | Comparative Experiments I 1 | 2 | 3 | 4 | 5 | 6 | 7 | 8 | 9 | 10 | 11 |
|---|---|---|---|---|---|---|---|---|---|---|---|---|---|---|---|
| Ultraviolet stabilizer | | | | | | | | | | | | | | | |
| ① | | | | | No stabilizer | 0.037 | 0.185 | 0.185 | 0.185 | | | | | | |
| ② | | | | | | | | | | 0.185 | 0.185 | 0.185 | | | |
| ③ | 0.037 | 0.185 | 0.037 | 0.185 | | | | | | | | | 0.185 | 0.185 | 0.185 |
| Ultraviolet absorbent | | | | | | | | | | | | | | | |
| ④ | | | 0.037 | 0.185 | | | | | | 0.185 | | | 0.185 | | |
| ⑤ | | | | | | | | | | | 0.185 | 0.185 | | 0.185 | 0.185 |
| ⑥ | 0.037 | 0.185 | | | | | | | 0.185 | | | 0.185 | | | |
| Antioxidant | | | | | | | | | | | | | | | |
| ⑦ | 0.037 | 0.185 | 0.037 | 0.185 | | | | 0.185 | 0.185 | | 0.185 | | | 0.185 | 0.185 |
| ⑧ | | | | | | | | | | 0.185 | | 0.185 | 0.185 | | |
| ⑨ | | | | | | 0.037 | 0.185 | | | | | | | | |
| Discoloration | o | o | o | o | x | x | x | Δ | o | x | Δ | Δ | Δ | Δ | o |
| Surface fusion | o | o | o | o | x | Δ | o | o | Δ | x | x | x | o | Δ | Δ |

TABLE 3
Unit: Parts by weight

| Stabilizer | Examples II 1 | 2 | Comparative Experiments II 1 | 2 | 3 | 4 | 5 | 6 | 7 | 8 | 9 | 10 | 11 | 12 |
|---|---|---|---|---|---|---|---|---|---|---|---|---|---|---|
| ① | 0.037 | 0.185 | No stabilizer | 0.037 | 0.185 | 0.185 | 0.185 | 0.185 | 0.125 | 0.185 | 0.185 | 0.185 | | |
| ② | | | | | | | | | | | | | 0.185 | 0.185 |
| ③ | | | | | | 0.185 | | | | | | | | |
| ④ | | | | | | | 0.185 | | 0.125 | 0.185 | | | | |
| ⑤ | | | | | | | | 0.185 | | | 0.185 | | | |
| ⑥ | 0.037 | 0.185 | | | | | | | | | 0.185 | | 0.185 | 0.185 |
| ⑦ | 0.037 | 0.185 | | | | | | | 0.125 | 0.185 | | 0.185 | 0.185 | |
| ⑧ | | | | 0.037 | 0.185 | | | | | | | | | |
| ⑨ | | | | | | | | | | | | 0.185 | | 0.185 |
| Discoloration | o | o | Δ | x | x | x | x | x | x | Δ | x | x | Δ | Δ |
| Surface crack | o | o | — | x | x | Δ | x | x | x | x | x | x | — | — |
| Surface fusion | o | o | x | o | o | o | o | o | o | o | o | o | x | x |

What is claimed is:

1. A two-liquid type polyurethane material for decorative parts, comprising a polyol component and an isocyanate component and having a stabilizer incorporated in said polyol component, which two-liquid type polyurethane material is characterized by the fact that said stabilizer is a ternary system of:
   (a) a hindered amine type ultraviolet stabilizer represented by the following chemical formula:

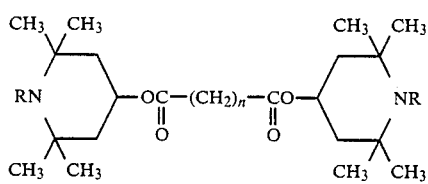

wherein n stands for an integer in the range of 6 to 10 and R for a hydrogen atom or a methyl group,
   (b) an acrylonitrile type ultraviolet absorbent represented by the following chemical formula:

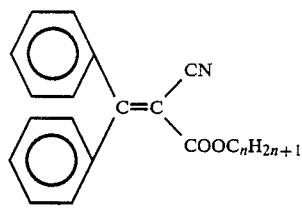

wherein n stands for an integer in the range of 2 to 8, and
   (c) a hindered phenol type antioxidant represented by the following chemical formula:

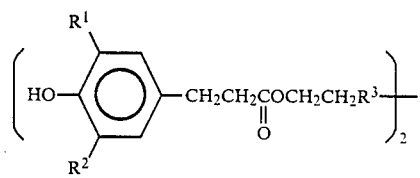

wherein $R^1$ stands for a branched alkyl group of 3 to 6 carbon atoms, $R^2$ for $R^1$, $CH_3$, or $C_2H_5$, and $R^3$ for $CH_2$ or $OCH_2$.

2. The polyurethane material according to claim 1, wherein said hindered amine type ultraviolet stabilizer is either bis(2,2,6,6-tetramethyl-4-piperidyl) sebacate or bis(1,2,2,6,6-pentamethyl-4-piperidyl) sebacate, said acrylonitrile type ultraviolet absorbent is either α-cyano-β-phenyl-(2-ethylhexyl) cinnamate or α-cyano-β-phenylethylcinnamate, and said hindered phenol type antioxidant is either triethylene glycol-bis[3-(3-t-butyl-5-methyl-4-hydroxylphenyl)propionate] or 1,6-hexanediol-bis[3-(3,5-di-t-butyl-4-hydroxyphenyl)propionate].

3. A decorative part comprising a base made of synthetic resin and a transparent synthetic resin part possessing a positive meniscus and deposited on the upper surface of said base and said transparent synthetic resin part being formed with cured polyurethane produced by the reaction of a polyol component and an isocyanate component, which decorative part is characterized by the fact that said stabilizer is a ternary system of:

(a) a hindered amine type ultraviolet stabilizer represented by the following chemical formula:

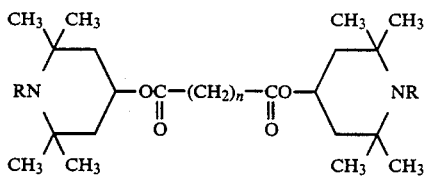

wherein n stands for an integer in the range of 6 to 10 and R for a hdyrogen atom or a methyl group, (b) an acrylonitrile type ultraviolet absorbent represented by the following chemical formula:

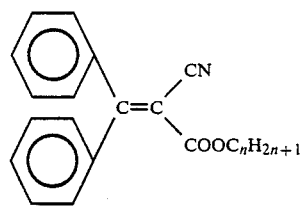

wherein n stands for an integer in the range of 2 to 8, and (c) a hindered phenol type antioxidant represented by the following chemical formula:

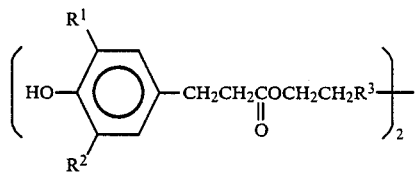

wherein $R^1$ stands for a branched alkyl group of 3 to 6 carbon atoms, $R^2$ for $R^1$, $CH_3$, or $C_2H_5$, and $R^3$ for $CH_2$ or $OCH_2$.

4. The decorative part according to claim 3, wherein said hindered amine type ultraviolet stabilizer is either bis(2,2,6,6-tetramethyl-4-piperidyl) sebacate or bis(1,2,2,6,6-pentamethyl-4-piperidyl) sebacate, said acrylonitrile type ultraviolet absorbent is either α-cyano-β-phenyl-(2-ethylhexyl) cinnamate or α-cyano-β-phenylethyl cinnamate, and said hindered phenol type antioxidant is either triethylene glycol-bis[3-(3-t-butyl-5-methyl-4-hydroxylphenyl)propionate] or 1,6-hexanediol-bis[3-(3,5-di-t-butyl-4-hydroxyphenyl)propionate].

5. The decorative part according to claim 3, wherein said decorative part is a combination decorative and reinforcing molding.

* * * * *